Inventor
ALBERT B. AUSTIN
By Chas. C. Reif
Attorney

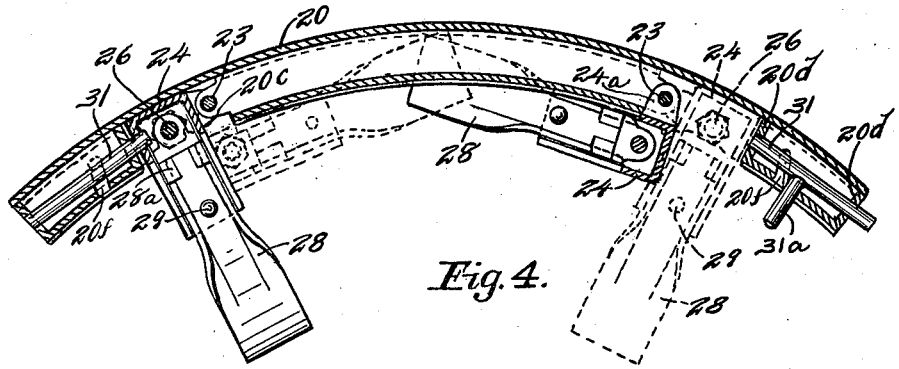
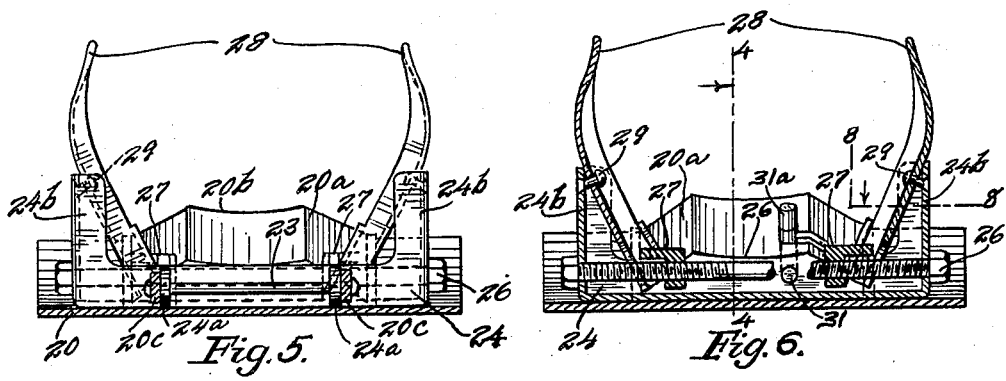
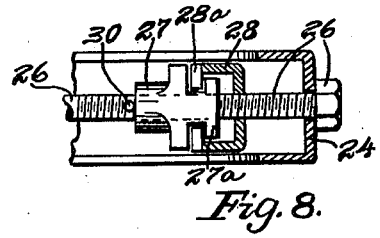
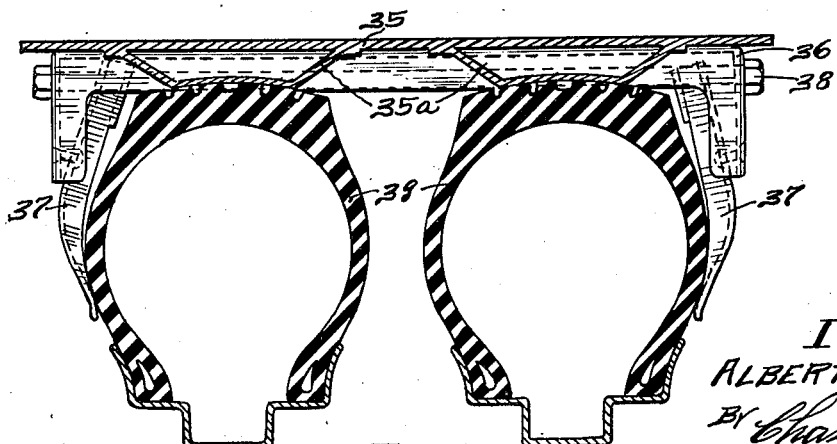

May 11, 1943.  A. B. AUSTIN  2,318,918
TRACTION DEVICE FOR AUTOMOBILES
Filed Dec. 26, 1940  4 Sheets-Sheet 3

Inventor
ALBERT B. AUSTIN
By Chas. C. Reif
Attorney

Patented May 11, 1943

2,318,918

UNITED STATES PATENT OFFICE 2,318,918

TRACTION DEVICE FOR AUTOMOBILES

Albert B. Austin, Minneapolis, Minn.

Application December 26, 1940, Serial No. 371,679

16 Claims. (Cl. 152—182)

This invention relates to a traction device and particularly to a traction device adapted to be applied to the tire of an automotive vehicle. Traction devices are almost a necessity where snow and deep mud are encountered in driving. While various types of traction devices have been previously used, the same are usually difficult of application. It is often necessary to place the traction devices on the wheels when the car is standing in the snow or mud and it is usually necessary for the operator to become badly soiled in placing the devices in position. It is also difficult to place the devices of the prior art on the tire or wheel particularly when it is standing in the snow or mud.

It is an object of this invention to provide a very simple and efficient traction device which can be very easily and quickly placed on the tire and be fastened thereon without the operator becoming soiled in the operation.

It is a further object of the invention to provide a very simple and efficient traction device which can be quickly placed on the tire at any location thereon and be tightened on the tire by means accessible from the exterior of the device.

It is also an object of the invention to provide a traction device comprising a member arranged to extend transversely of the tire tread and having arms pivoted adjacent its ends extending inwardly radially of the tire, said arms being separable so as to be easily placed over the tire and having their free ends extending toward each other so as to engage the tire inwardly of its widest portion and be firmly held thereon.

It is further an object to provide a device as set forth in the preceding paragraph together with means accessible from the side of said device for moving said arms toward and from each other so that the device can be placed in position or removed with great ease and without the necessity of the operator becoming soiled in the operation.

Another object of the invention is to provide a traction device for a tire-equipped wheel of an automotive vehicle comprising a member arranged to extend transversely of the tire tread and having arms pivoted adjacent its ends arranged to extend inwardly substantially radially of the tire, said arms being constructed to engage the tire inwardly of its widest portion so as to be held firmly thereon, together with means accessible from the exterior of said member for moving said arms toward and from each other, said member preferably having plate-like portions extending circumferentially of the tire to prevent turning or oscillation of said member.

It is still another object of the invention to provide a traction device, members spaced circumferentially of the tire adapted to extend transversely thereof, said members having portions extending radially inwardly of said tire, arms secured intermediate their ends to said inwardly extending portions, said arms extending radially inwardly and adapted to engage the tire inwardly of its widest portion, means accessible from the exterior of said members for moving said arms toward and from each other and a plate-like member or other means extending circumferentially of the tire and between said members.

It is also an object of the invention to provide such a device as set forth in the preceding paragraph, said first mentioned members with the arms secured thereto being swingable toward said plate-like members together with releasable means for holding said members with the arms extending radially inward.

These and other objects and advantages of the invention will be fully set forth in the following description made in connection with the accompanying drawings in which like reference characters refer to similar parts throughout the several views and in which:

Fig. 4 is a vertical section taken substantially on line 4—4 of Fig. 6 as indicated by the arrow;

Fig. 5 is a sectional view taken substantially on line 5—5 of Fig. 2 as indicated by the arrows;

Fig. 6 is a sectional view taken substantially on line 6—6 of Fig. 2 as indicated by the arrows;

Fig. 7 is a vertical section taken on line 7—7 of Fig. 3 as indicated by the arrows;

Fig. 8 is a horizontal section taken substantially on line 8—8 of Fig. 6 as indicated by the arrow;

Fig. 9 is a vertical section through a modified form of the device which is used with a double wheel and tire;

Figure 1:
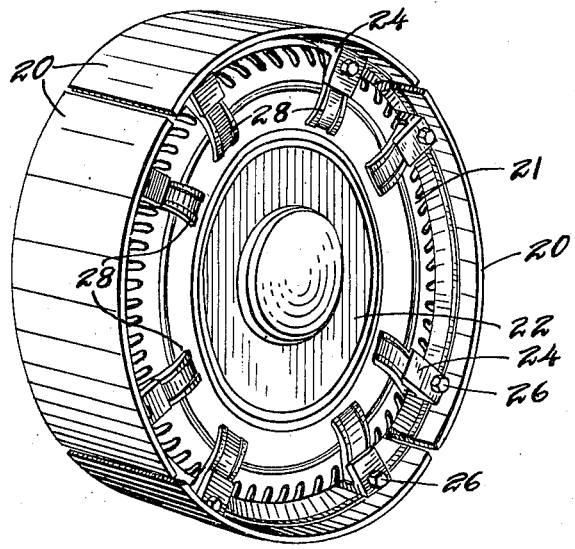
Fig. 1 is a perspective view of a wheel and tire equipped with one form of the invention.
Figure 3:
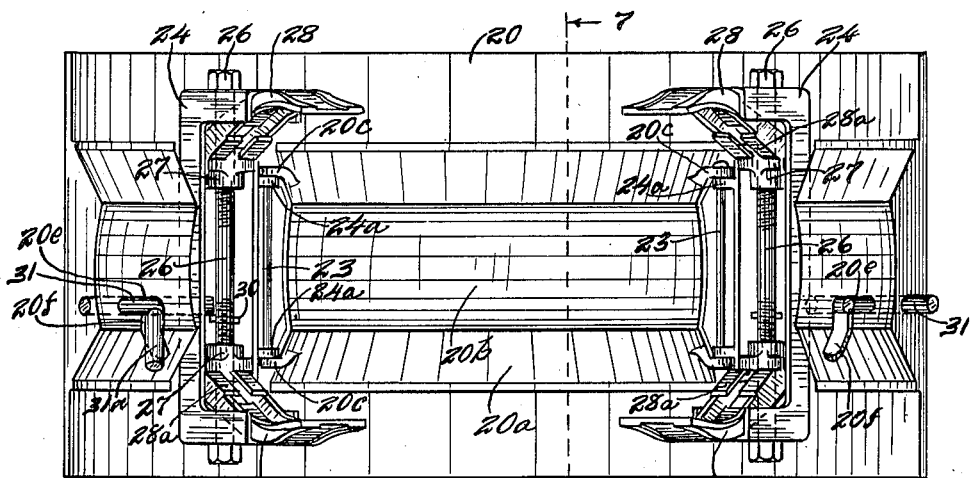
Fig. 3 is a plan view as seen from the lower side of Fig. 2.

Referring to the drawings, particularly Figs. 1 to 8, a traction device is shown comprising a tread plate 20. While this plate may be varied in form, in the embodiment of the invention illustrated it is shown as a segment of a cylinder having parallel sides. Member 20 has a portion 20a at its inner or concave side, which in the embodiment of the invention illustrated is shown as integral with plate 20. Portion 20a has a central concave surface 20b adapted to engage the tread of the tire 21 shown in Fig. 1 as mounted upon the wheel 22. Portion 20a is interrupted at spaced points so that transverse passages are formed therethrough and the central part of said portion has spaced apertured lugs 20c at each end thereof. Headed pins or rivets 23 extend through and between lugs 20c and also through apertured lugs 24a projecting from the sides of members 24 so that members 24 are pivotally connected to portions 20a and swingable about the axes of pins 23. As shown in Figs. 1 to 6 members 24 are disposed in the above mentioned spaces formed in portion 20a and seat against the inner surface of plate 20. While portions 24 could be variously made, in the embodiment of the invention illustrated they are shown as of channel shape in cross section and the same have portions 24b at each end which extend substantially radially inwardly of the tire. A headed screw 26 extends longitudinally of each member 24, the same being journaled in the ends of member 24 and provided with polygonal heads at the outer ends of member 24, said heads being shown as hexagonal. Disposed within each member 24 and threaded on screw 26 are members 27. Each member 27 has a hub portion threaded on screw 26 and also has an outwardly projecting T-shaped portion 27a. The screw 26 is provided with threads adjacent each end and these threads are respectively right and left hand. A pair of arms 28 are pivoted to each member 24, said arms being shown as of general channel shape except at their outer free ends and each arm is connected to a portion 24b by a headed rivet 29 shown as countersunk in portion 24b. Rivet 29 passes through an aperture in arm 28 and is of sufficient length to permit a rocking or swinging movement of arm 28 about said rivet. Arms 28 extend inwardly and are slotted to embrace screw 26 and provided with inwardly extending flanges 28a which seat in the slots beneath the head of portion 27a so that the inner ends of arms 28 are connected to members 27. A pin 30 is preferably placed in screw 26 to limit the inward movement of member 27 in the rotation of screw 26. It will be noted that the free ends of arms 28 are curved toward each other and are substantially flat so that said arms can engage a tire inwardly of its widest portion or adjacent the rim of the wheel so as to be held firmly on the tire and so as not to be movable outwardly therefrom. The remote sides of the members 24 are apertured and adapted to receive the ends of pins 31 which are journaled in flanges 20b of portion 20a. Each pin 31 has a handle portion 31a extending inwardly at right angles therefrom and through a slot 20e formed in the central part of portion 20a. A slot 20f also extends laterally from slot 20e and pin 31 can be rocked in flanges 20d so that handle portion 31a moves into slot 20f and locks pin 31 against longitudinal movement. Pin 31 can thus be locked in position with member 24 in the position shown at the left of Fig. 4. When the device is in place on the tire handle portion 31a engages the tire and it cannot move out of slot 20f. There is thus no possibility of member 24 moving about the axis of pin 23 when the device is in operative position.

Figure 2:
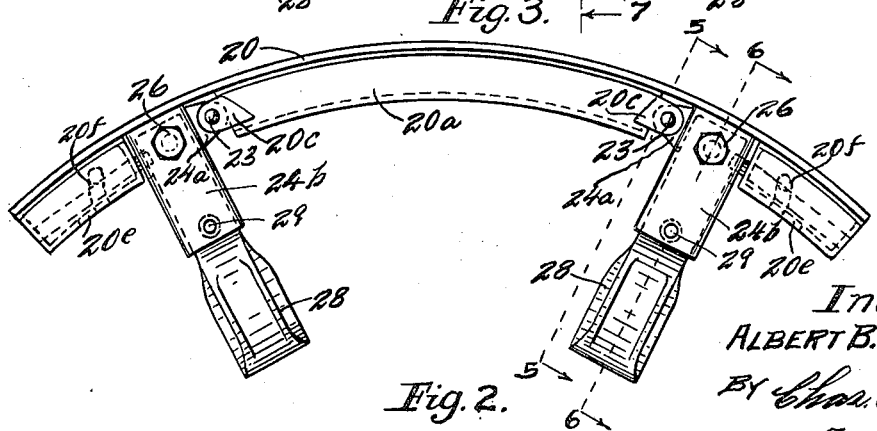
Fig. 2 is a view in side elevation of one form of the device.
Figure 11:
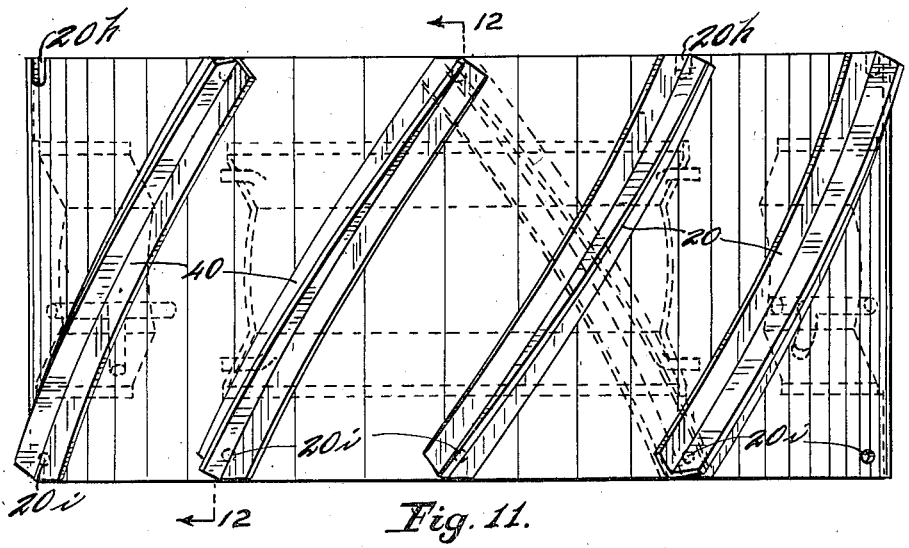
Fig. 11 is a top plan view of the device shown in Fig. 10.

In operation the members 24 will be in the position shown in Fig. 2. Members 26 can be turned by the application of a wrench or other tool to the head portions thereof. Said screws 26 will be turned so that the free ends of arms 28 are sufficiently separated to be passed over the sides of the tire. The device can thus be easily and quickly placed in position on any exposed portion of the tire. When the device is so placed in position with surface 20b engaging the tire tread, the operator will then turn screws 26 to move the free ends of arms 28 toward each other. The ends of said arms will then be brought firmly against the sides of the tire inwardly of the widest portions thereof. The device will thus be firmly secured on the tire against removal. The heads of the screw 26 being accessible from the exterior of members 24 it is an easy and convenient operation to turn them to fasten the device in place. The device can thus be placed on the tire or wheel with the greatest convenience and without any necessity for the operator becoming soiled in the operation. As shown in Fig. 1 enough of the devices can be used to entirely surround the wheel. The device will thus have great utility where very heavy vehicles must pass through snow or soft earth. Such vehicles as heavy trucks, gun mounts and others can thus be quickly equipped with the devices and move over roads or other places which would otherwise be impassable. When the devices are not in use the members 24 and the arms carried thereby can be swung to the position shown at the right hand side of Fig. 4 by releasing them from pins 31. The device is thus brought into more compact position for transportation or storage.

In Fig. 9 a modification of the device is shown in which the plate 35 corresponding to plate 20 is provided with two portions 35a corresponding to portion 20a. The plate is thus of sufficient width to extend over two tires 39 such as are now commonly used on double wheels. Such wheels are more or less common on busses and heavy trucks. The members 36 which correspond to members 24 have the arms 37 pivoted thereto corresponding to arms 28. Arms 37 are moved toward and from each other by a heated screw 38 similar to the screw 26 already described. Otherwise the structure shown in Fig. 9 is similar to the structure for the single tire above described.

Figure 10:
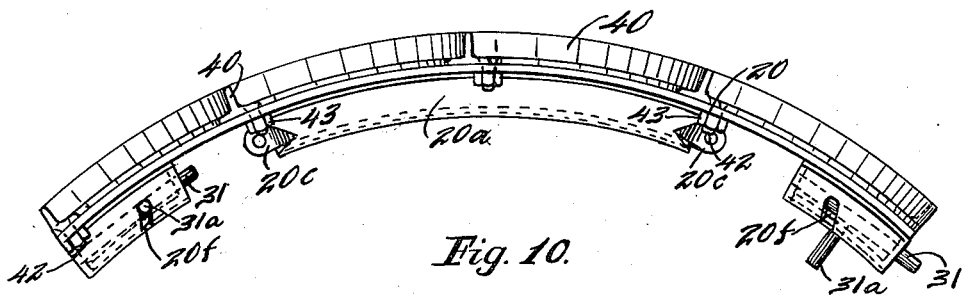
Fig. 10 is a view in side elevation of a modified form of tread device.
Figure 12:
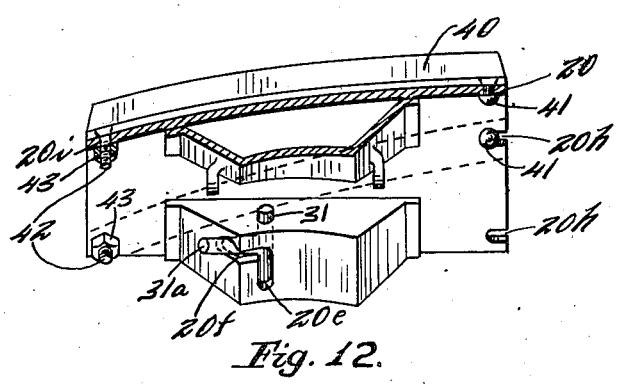
Fig. 12 is a vertical section taken substantially on line 12—12 of Fig. 11 as indicated by the arrows.
Figure 13:
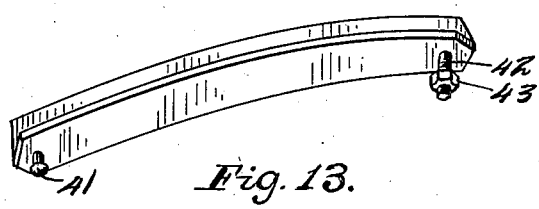
Fig. 13 is a perspective view of a traction lug used.

In Figs. 10 to 13 the plate 20 shown in Figs. 1 to 7 is shown and the same has applied thereto removable traction lugs or cleats 40. While the form of the cleats could be varied as desired, in the embodiment of the invention illustrated they are shown as substantially T-shaped in cross section as seen in Fig. 10 and are designed to extend in a direction at an angle to the axis of the wheel or in helical form around the cylindrical surface of plate 20. Each cleat is provided with a headed stud 41 at one end and at its other end is provided with a threaded stud 42. The plate 20 is provided at one side with open-ended slots 20h and adjacent its other side is provided with holes 20i. In placing the cleats in position the stud 41 is moved into one of the slots 20h so that the head portion is beneath plate 20. The cleat is then brought to position with stud 42 extending through one of the holes 20i. A nut 43 is then placed on stud 42 and tightened against the underside of plate 20. The cleats are thus firmly secured on the plate 20 and can be placed thereon and received therefrom with little effort. The cleats will act to give increased traction to the wheel.

Figure 14:
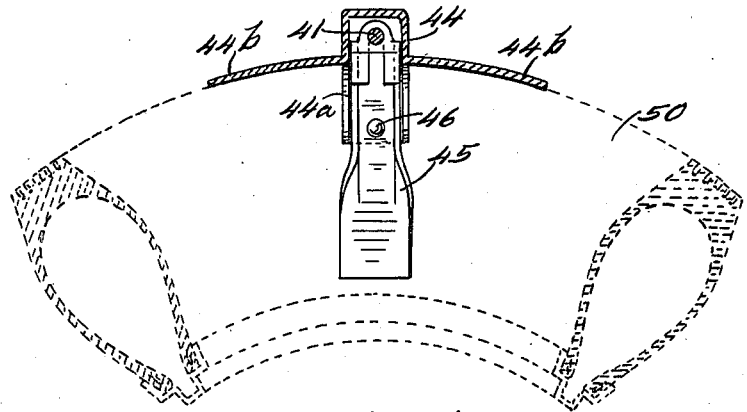
Fig. 14 is a central vertical section of a modification of the invention taken on line 14—14 of Fig. 16.
Figure 15:
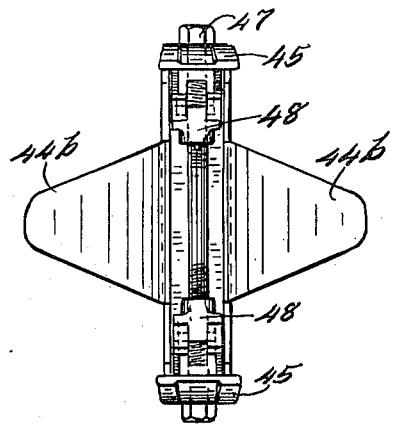
Fig. 15 is a bottom plan view of the device shown in Fig. 14.
Figure 16:
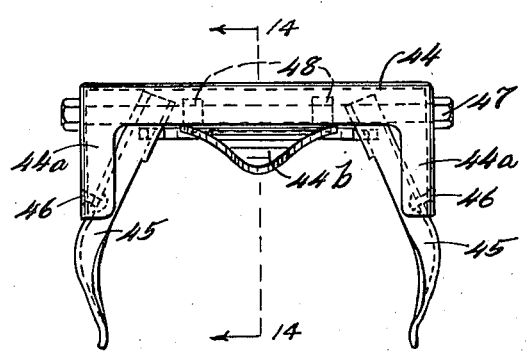
Fig. 16 is a view in side elevation of the device shown in Figs. 14 and 15.

In Figs. 14 to 16 a form of the device is shown which is very suitable for passenger automobiles. With such vehicles traction devices are not usually necessary unless deep snow or unusually deep mud is encountered. In such cases it is desirable to have a traction device which can be easily and quickly placed on the wheel and which is of such bulk that it can be transported without inconvenience. Referring to said vehicles a device is shown comprising a member 44 of the same general shape as the member 24 already described. Like member 24 member 44 is of channel shape and has inwardly extending end portions 44a. Arms 45 are pivoted to the portions 44a by the rivets 46, which arms and rivets are of the same structure as portions 28 and 29 already described. Member 44 also has a headed screw 47 extending therethrough on which are threaded members 48, members 47 and 48 being identical with members 26 and 27 already described. Members 48 thus have T-shaped portions connecting them to the inner ends of arms 45 just as members 27 are connected to the inner ends of arms 28. Member 44 has extending at either side thereof and arranged to engage the tire tread, plates 44b. While these plates could be variously attached to member 44, in the embodiment of the invention illustrated they are shown as integral with said member. Said plates taper in width away from member 44.

In operation, when the device is to be placed on a tire-equipped wheel screw 47 will be turned by applying a wrench or other tool to the head portions thereof which are easily accessible from the exterior of member 44. The device can then be placed over the tire as indicated in Fig. 14 with the arms 45 extending substantially radially inward. Screw 47 will then be turned to move the free ends of arms 45 toward each other so that the end portions of said arms will engage the tire 50 inward of the widest portion thereof. The device will thus be very securely held on the tire. The plates 44b will prevent any rocking or oscillating of member 44 due to engagement with the ground. The member 44 will thus form a very efficient cleat or traction element and will enable the car to progress through soft mud or deep snow. The device can be quickly and easily placed on any accessible portion of the tire. It is unnecessary for the operator to become soiled in applying the device as it is easily tightened by turning screw 47 and this is very accessible at the side of the tire. If desired two or more of the devices could be placed on the tire. The devices are comparatively small in bulk and weight and can be easily carried without inconvenience in the modern automobile.

From the above description it will be seen that I have provided a simple and efficient traction device and one that can be quickly placed on or removed from the tire with great ease. The device is very rugged and will withstand the roughest sort of treatment. As above stated the form shown in Figs. 1 to 7 with or without the cleat structure shown in Figs. 10 to 13 has a high degree of utility with very heavy vehicles. Even such vehicles as gun mounts where a very unusual weight is sustained the devices will enable the vehicles to travel through soft places, mud or deep snow. The plates 20 can be made of a width which will adequately support the vehicles.

The form shown in Figs. 14 to 16 has a high degree of utility with ordinary automotive vehicles. It has become a rather common practice for motorists to have a small number of traction devices on the tire rather than a structure which entirely surrounds the tire such as chains. With these all the necessary traction can be readily secured. The device shown in Figs. 14 to 16 stays securely in place on the tire and gives all of the desired traction. The devices have been amply demonstrated in actual practice and found to be very successful and efficient.

It is obvious that the plate or means 20 extending between the members 24 could take various forms of traction devices. It is also within the scope of the invention to have the lugs 40 in various forms and these could form track flanges so that the vehicle could run on the regular iron or steel rails used for railways.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A traction device for a tire-equipped wheel of an automobile having in combination, a member having a rigid portion adapted to extend transversely of the tread of said tire, a pair of arms pivoted respectively adjacent each end of said member and extending substantially radially inwardly along the sides of said tire and being separable so as to be placed over said tire, said arms having their end portions extending toward each other so as to engage said tire inwardly of its widest portion and adjacent the rim of said wheel and means accessible from the exterior of said member, extending transversely of said tire engaging said arms and rotatable for moving said arms to so engage said tire tread.

2. The structure set forth in claim 1, and plate-like portions separate from said arms extending from said member circumferentially of said tread adapted to engage the latter to prevent rotation of said member.

3. A traction device for a tire-equipped wheel of an automobile having in combination, a member having a rigid portion adapted to extend transversely of the tread of said tire and having portions extending radially inwardly, a pair of arms pivoted respectively intermediate their ends to said portions and extending substantially radially inwardly along the sides of said tire and being separable so as to be placed over said tire, said arms having their end portions extending toward each other so as to engage said tire inwardly of its widest portion and rotatable means carried by and extending lengthwise of said member transversely of said tire and having its actuating portion at the exterior of said member for moving the inner ends of said arms toward and away from each other to cause the free ends thereof to engage said tire.

4. The structure set forth in claim 3 and a plate secured to said member and extending circumferentially of said tread at either side thereof.

5. A traction device for a tire-equipped wheel of an automotive vehicle having in combination, a member adapted to extend transversely of the tread of said tire, said member being of channel form with its open side adjacent said tire, a pair of members slidable in said member, a pair of arms pivoted respectively intermediate their ends to said member radially inwardly of said tread, the inner ends of said arms being connected respectively to said pair of members, said arms being separable so as to be placed over said tire and extending substantially radially inward and having their free ends extending toward each other so as to engage the tire inwardly of its widest portion and a member extending through said first mentioned member and engaging said pair of members for moving the same toward and from each other to move said arms, said last mentioned member having a portion at the outer side of said first mentioned member adapted to be rotated for moving said arms into and out of engagement with said tire.

6. A traction device for a tire-equipped wheel of an automobile having in combination, a member adapted to extend transversely of the tread of said tire, said member being substantially channel-shaped in cross section, a screw extending longitudinally of said member having end portions at the exterior of said member adapted to be rotated by a suitable tool, said screw having threaded portions adjacent its ends with right and left hand ends respectively, members threaded on said portions respectively, arms secured to the ends of said member and extending radially inward, the inner ends of said arms being connected to said last mentioned members respectively, said arms being swingable and having free ends adapted to engage said tire inwardly of the widest portion thereof.

7. A traction device for a tire-equipped wheel of an automobile having in combination, a member adapted to extend transversely of the tread of said tire, said member having portions extending radially inwardly of said tire, arms swingingly mounted intermediate their ends on said portions respectively, said arms having free ends extending towards each other so as to grip said tire inwardly of the widest portion thereof, a screw having right and left hand ends respectively extending longitudinally of said member and having portions at the exterior of said member adapted to be rotated, members threaded on the threads of said screw respectively and connected to the inner ends of said arms, whereby rotation of said screw will move said arms toward or from each other.

8. The structure set forth in claim 7, said members on said screw having T-shaped portions and said arms being of channel shape at their inner ends and having flanges loosely connecting the same to said T-shaped portions.

9. A traction device for a tire-equipped wheel of an automotive vehicle having in combination, a pair of members spaced circumferentially of said tire and adapted to extend across the tread thereof, arms pivoted respectively to each of said members adjacent their ends and extending inwardly radially of said tire, the pair of arms pivoted to each member having their free ends extending toward each other so as to engage said tire inwardly of its widest portion and separable so as to be placed over said tire, means accessible from the exterior of said first mentioned members for moving said arms toward and from each other and a plate-like member secured to said first mentioned members and extending circumferentially of said tire.

10. The structure set forth in claim 9, said first mentioned members being movable with the arms pivoted thereto about axes respectively extending transversely so that said arms are positioned substantially at right angles to their radial positions.

11. The structure set forth in claim 9, said first mentioned members being movable with the arms pivoted thereto about axes respectively extending transversely so that said arms are positioned substantially at right angles to their radial positions and means for holding said members in position with said arms extending radially inward.

12. A traction device for a tire-equipped wheel of an automotive vehicle having in combination, a pair of members spaced circumferentially of said tire and adapted to extend across the tread thereof, arms pivoted respectively to each of said members adjacent their ends and extending inwardly radially of said tire, the pair of arms pivoted to each member having their free ends extending toward each other so as to engage said tire inwardly of its widest portion and separable so as to be placed over said tire, means accessible from the exterior of said first mentioned members for moving said arms toward and from each other, a member extending circumferentially of said tire adapted to engage said tread at its inner portion and having spaced transverse openings therein in which said pair of members are disposed, said plate and members being secured together and means carried adjacent each of said openings in said last mentioned member for respectively locking said pair of members in position with said arms extending radially inwardly.

13. A traction device for a tire-equipped wheel of an automotive vehicle having in combination, a pair of members spaced circumferentially of said tire and adapted to extend across the tread thereof, arms pivoted respectively to each of said members adjacent their ends and extending inwardly radially of said tire, the pair of arms pivoted to each member having their free ends extending toward each other so as to engage said tire inwardly of its widest portion and separable so as to be placed over said tire, means accessible from the exterior of said first mentioned members for moving said arms toward and from each other, a member extending circumferentially of said tire adapted to engage said tread at its inner portion and having spaced transverse openings therein in which said pair of members are disposed, said last mentioned member having pins slidable therein adapted to enter said pair of members respectively for holding the same in position with said arms extending radially inwardly, said pins having portions extending inwardly therefrom and receivable in slots in said last mentioned member so as to be engaged by the tread of said tire when said device is in place and thus be locked in position.

14. A traction device for a tire-equipped wheel of an automotive vehicle having in combination, a rigid member extending transversely of the tread of said wheel and of a length to extend across the tread of dual tires on said wheel, arms respectively pivoted adjacent the ends of said member, said arms being separable so as to be placed over said tires and having their free ends extending toward each other so as to engage the remote sides of said tires inwardly of their widest portions, rotatable means journalled in and extending transversely through said member and having a portion accessible from the exterior of said member for moving said arms toward and from each other and a plate member secured to said member and extending circumferentially of said tire and of a width to extend over both of said tires.

15. A traction device for a tire-equipped wheel of an automotive vehicle having in combination, a plurality of members spaced circumferentially of said tire and adapted to extend across the tread thereof, arms pivoted respectively to each of said members adjacent their ends and extending inwardly radially of said tire, the pair of arms pivoted to each member having their free ends extending toward each other so as to engage said tire inwardly of its widest portion and separable so as to be placed over said tire, means accessible from the exterior of said first mentioned members for moving said arms toward and from each other and means extending circumferentially of said tire adapted to engage the tread thereof whereby said tire is surrounded by said traction device.

16. The structure set forth in claim 15, said last mentioned means comprising plate-like members projecting laterally at each side of said tire.

ALBERT B. AUSTIN.